United States Patent [19]

Hills et al.

[11] Patent Number: 5,744,055
[45] Date of Patent: Apr. 28, 1998

[54] STABLE MONOPERSULFATE TRIPLE SALT AND ITS METHOD OF PREPARATION

[75] Inventors: William A. Hills, Lawrenceville; James L. Manganaro, Princeton; Basil A. Guiliano, Lawrenceville; Dean S. Thorp, Plainsboro, all of N.J.

[73] Assignee: FMC Corporation, Philadelphia, Pa.

[21] Appl. No.: 549,111

[22] Filed: Oct. 27, 1995

[51] Int. Cl.$^6$ .................. C01B 15/043; C01B 15/08
[52] U.S. Cl. .................. 252/186.27; 252/186.22; 423/513; 423/275; 428/403; 510/309; 427/213; 427/215; 427/427
[58] Field of Search ............... 252/186.22, 186.25, 252/186.27; 423/513, 275, 521, 415.2; 428/403; 510/309, 452, 442; 427/212, 213, 215, 424, 427

[56] References Cited

U.S. PATENT DOCUMENTS

| | | | |
|---|---|---|---|
| 2,802,722 | 8/1957 | Stepmanon | 423/513 |
| 2,886,412 | 5/1959 | Lake et al. | 423/275 |
| 2,886,534 | 5/1959 | Lake et al. | 252/186.22 |
| 2,901,319 | 8/1959 | D'Addieco | 423/513 |
| 2,926,998 | 3/1960 | D'Addieco et al. | 423/521 |
| 2,955,086 | 10/1960 | Hyatt | 252/186.3 |
| 3,041,139 | 6/1962 | D'Addieco et al. | 423/513 |
| 4,105,827 | 8/1978 | Brichard | 428/403 |
| 4,171,280 | 10/1979 | Maddox et al. | 252/186.32 |
| 4,321,301 | 3/1982 | Brichard et al. | 428/403 |
| 4,526,698 | 7/1985 | Kuroda et al. | 252/186.27 |
| 4,526,699 | 7/1985 | Jones | 510/302 |
| 4,731,195 | 3/1988 | Olsen | 252/186.34 |
| 5,151,212 | 9/1992 | Bell | 252/186.38 |
| 5,194,176 | 3/1993 | Copenhafer et al. | 252/186.27 |
| 5,219,549 | 6/1993 | Onda et al. | 423/415.2 |
| 5,332,518 | 7/1994 | Kuroda et al. | 252/186.27 |
| 5,409,627 | 4/1995 | Boskamp et al. | 252/186.27 |

OTHER PUBLICATIONS

Derwent Abstract No. 84-309800, Entitled: "Bleaching Detergent Composition–Surface Coated With Agents Containing Borate and Alkali Silicate", Taken From JP 59193999 A (Feb. 11, 1984).

D.L. Ball and J.O. Edwards, J. Am. Chem. Soc., 78, 1125–1129 (1956).

Ozone® Monopersulfate Compound, E.I du Pont de Nemours & Co. (Inc.), Electrochemicals Dept., Undated (pre–1969).

Chemical Abstracts, 102, 97329z (1985).

*Primary Examiner*—Joseph D. Anthony
*Attorney, Agent, or Firm*—Anthony L. Cupoli; Bruce M. Monroe; Patrick C. Baker

[57] ABSTRACT

Composition and method of making bicaroate and bicaroate/dipersulfate mixtures which are stabilized, in dry form, with a coherent coating of sodium borosilicate. The borosilicate is formed in situ by the reaction of a sodium silicate and a sodium metaborate.

23 Claims, No Drawings

STABLE MONOPERSULFATE TRIPLE SALT AND ITS METHOD OF PREPARATION

TECHNICAL FIELD

The present invention is a solid composition which releases active oxygen in the presence of water, but is stable when incorporated into solid household and laundry detergents. More particularly, the invention is a stable bicaroate salt or, alternatively, a stable mixture of a bicaroate salt and a peroxydipersulfate.

BACKGROUND ART

There is mounting interest in replacing chlorine compounds as a bleach in cleaning compounds and in many other bleaching applications. One replacement candidate includes those compounds containing active oxygen, as such compounds are believed to be more environmentally compatible than are compounds containing chlorine. However, the relative instability of active oxygen containing compounds has been a barrier to this replacement effort. Some peroxygen compounds, the percarbonates, have been rendered suitable by the use of coatings. For example, Onda et al, U.S. Pat. No. 5,219,549, teach coating a sodium percarbonate by separately spraying it with an aqueous boric acid solution and an aqueous alkali metal silicate solution. The solutions are simultaneously sprayed onto the percarbonate particles and dried to prevent agglomeration of the particles; moreover, the boric acid solution and the alkali metal silicate solution are simultaneously, but separately applied to avoid the formation of a gel or the precipitation of silicon dioxide, an impurity found in such systems. Certain coating materials, such as boric acid, have, as described in Lake et al, U.S. Pat. No. 2,886,412, moreover, been coprocessed with sodium dipersulfate in order to prevent agglomeration of the dipersulfate; thus making spray drying of the dipersulfate possible.

One of the most powerful of the oxidizing agents is the peroxygen compound known as Caro's acid. This acid is only stable in salt form, and then only as the potassium triple salt ($2KHSO_5KHSO_4K_2SO_4$), which has the active oxygen containing component potassium bicaroate ($KHSO_5$). Because it is such a strong oxidizing agent, this triple salt would make a good bleaching agent if it could be made stable.

DuPont sells, under its own trademark, the product, Oxone® peroxygen, a potassium bicaroate, which is the potassium triple salt of Caro's acid. It would be advantageous if the potassium bicaroate, a salt which is an excellent oxidizer, and which has excellent bleaching power, could be modified, so that it could be incorporated into a cleaning formulation. Traditionally the instability and the reactivity of this bicaroate with other chemicals normally found in cleaning formulation has, however, prevented its use in such formulations. Since the main threat to the stability of peroxygen bleaches is moisture at elevated pH and temperature, it is desired to find a way of stabilizing the caroate salt.

Sodium carbonate perhydrate has been stabilized by encapsulation with a borosilicate coating; however, in that instance the sodium carbonate per hydrate, itself, is alkaline, as are the sodium borosilicate and the ingredients used to produce sodium borosilicate: sodium metaborate and sodium silicate. The potassium triple salt of Caro's acid, would not be considered as good candidate for encapsulating with sodium borosilicate, because being acidic, it might react with the alkaline sodium borosilicate. Moreover, as it is significantly more reactive than sodium percarbonate perhydrate, it could have adverse reactions, even with the impurities in the coating solution.

Furthermore, the potassium triple salt would not be considered a good candidate for a bleaching application, because it can react with the moisture present on hands, or on other parts of a body, causing burns. And it can react with the moisture in the air or with other ingredients in a detergent formulation, and it can serve to activate persulfate, and reduce it active oxygen level.

SUMMARY OF THE INVENTION

It has now been found that the triple salt of Caro's acid can be stabilized by encapsulating it with a coherent borosilicate coating, as can be mixtures of the triple salt and dipersulfate, also known as peroxydipersulfate or $S_2O_8^{-2}$. Thus, the invention can include a stable mixture of encapsulated bicaroate and encapsulated dipersulfate, or, alternatively, an encapsulated mixture of bicaroate and dipersulfate.

DESCRIPTION OF THE PREFERRED EMBODIMENTS

This is surprising because, being acidic, the triple salt of Caro's acid, would be much more likely to react with the alkaline borosilicate coating solution during preparation, and perhaps afterwards also. And, since potassium bicaroate, the component of the salt which has the available oxygen, is significantly more reactive than sodium percarbonate perhydrate, the bicaroate would have been considered to have a greater tendency to react with impurities in the coating solution. For either reason, bicaroate would not be expected to be a good candidate for encapsulation.

However, despite these considerations, borosilicate encapsulated bicaroates can be produced with a high active oxygen content.

Moreover, the encapsulated bicaroate is safer to handle than uncoated bicaroate. The borosilicate coating serves a beneficial dual function and purpose.

One the one hand, it serves as a barrier to keep small quantities of water, found in the air as humidity, or on skin, as perspiration, from reacting with the bicaroate. On the other hand, it readily dissolves in the large volumes of water used in bleaching operations to liberate the bicaroate and make it available for bleaching.

The present invention overcomes the difficulties of the prior art by providing a process for preparing a storage-stable bicaroate composition comprising:

a) suspending substantially dry particles of a potassium bicaroate in air;

b) contacting the dry particles with a plurality of fine drops of an aqueous solution containing a mixture of sodium silicate and sodium metaborate; and c) concomitantly evaporating substantially all this water at a sufficient rate to avoid moistening or hydrating the dry particles, thereby providing the potassium bicaroate with an encapsulating coating of from 2% to 10% by weight, preferably 2 to 8% by weight and most preferably 4 to 8% by weight.

Mixtures of the bicaroate and a sodium, potassium, or ammonium peroxydisulfate can also be coated using this same procedure with the same weight percent of coating. Alternatively the bicaroate and the peroxydisulfate can each be separately coated, using this same procedure, and then mixed together to form a mixture of coated bicaroate and coated peroxydisulfate.

Generally, the particles of potassium bicaroate that are to be coated can be of any particle size suitable for air suspension. Preferably, these particles will be size compatible with other detergent components to permit uniform mixing, and to prevent separation because of size and density differences.

The caroate particles are coated with a borosilicate, which can be produced in situ by admixing water, sodium silicate, and sodium metaborate. Solutions of this coating composition can vary in concentration from about 12 to 25 wt % solids.

Higher concentrations than 25% can be used but usually must be preheated to prevent crystallization or other solids formation and to permit atomization into fine droplets. More dilute solutions require a greater heat input to evaporate the water sufficiently to prevent wetting the particles being coated. With care, solutions can range from about 15% solids to about 35% solids.

The preparation of a 25% solids solution illustrated as follows:

Sodium metaborate: Add 261.8 grams sodium metaborate tetrahydrate to 238.2 g water.

Sodium silicate: Add 334.4 g of a 37.4% solution of sodium silicate $SiO_2:Na2O$ weight ratio=3.22) to 165.8 g water.

Sodium borosilicate: A blend of the above solutions, or their equivalents will contain about 1.4 parts by weight $SiO_2$ per part by weight $B_2O_3$, a solution containing from about 40 to 60 parts by weight sodium silicate and from about 60 to 40 parts by weight sodium metaborate will have a $SiO_2$ to $B_2O_3$ ratio ranging from 1:1 to about 2:1.

The borosilicate coating solution is a mixture that can contain varying ratios of sodium silicate to sodium metaborate. Surprisingly, sodium silicate, by itself, and sodium metaborate, by itself, are too brittle to maintain a coherent coating and too insoluble in water to permit solubilization of the coating when desired to activate the bicaroate. When the metaborate and the silicate are mixed together in the proper ratio, however, a coherent borosilicate coating is formed on the surface of the triple salt particle, which isolates the bicaroate from moisture and other reactive chemicals when the encapsulate is being stored or transported, but, which is rapidly solubilized when the encapsulate is mixed with water to permit the caroate to provide its desired oxidizing function. For this functionality a ratio of 0.5:1 to about 2:1 of sodium silicate to sodium metaborate is generally suitable; a ratio of 0.5:1 to 1:1.5 is preferred, and a ratio of 1:1 is most preferred.

Generally, the encapsulated peroxygen contains from 2 to 10 weight percent coating, based on the total weight of the encapsulated product; preferably from 2 to 6 weight percent; and most preferably from 2 to 4 weight percent. As the purpose of the coating is to inhibit decomposition of the peroxygen by water that may be absorbed from the air, it is important that sufficient coating be used to obtain a coherent coating on the surface of the peroxygen particle. Thus, as the weight per cent of coating used decreases, the likelihood of obtaining a coherent coating for the particles in the mixture decreases. As a practical matter, a coating of 2 to 4 weight percent provides a coherent coating. As the amount of coating falls below this range, the likelihood of failing to obtain a coherent coating increases. As the amount of coating increases, the time required to release the peroxygen in an application may unreasonably increase.

Typically, the microencapsulate is used in applications to provide a bleaching action to remove stains in laundry cleaning, automatic dish washing, and hard surface cleaning such as walls, toilet bowls, concrete surfaces and wood surfaces, etc. It may be used separately as a bleach or in combination with other compatible cleaning formulations.

The invention can be appreciated from the following examples, which are intended as a further illustration of the invention, but not as a limitation on the scope of the invention. All parts and percentages in the examples, and throughout the specification and claims, are by weight, all temperatures are in degrees centigrade, and all values imply the term "about," unless otherwise indicated.

Preparation of the Coating Solution

A 25% sodium borosilicate solution (1:1 blend of sodium silicate to sodium metaborate) was prepared by adding 261.8 g of granular, technical grade sodium metaborate ($Na_2B_2O_4 8H_2O$) to 404 g of deionized water, which has been heated to 140° F. (63° C.) in a 1000 ml beaker. The 140° F. temperature was maintained while the solution was agitated to dissolve the sodium metaborate. When the solution cleared, 334.2 g of sodium silicate solution (41° Be) was added while maintaining the temperature at 145° F. The temperature of the coating solution was maintained at 145° F. during the coating process to keep it free of particles and to maintain a viscosity which could be easily pumped. This coating solution was used to prepare all the samples exemplified in Tables 1 and 2.

Preparation of Coated Compositions

All the samples were prepared using the following procedure: The peroxygen was coated using a fluid bed coating apparatus, a Strea-1 Laboratory Fluid-bed Coater, manufactured by Aeromatic, a division of Niro Industries. This coater has a fluid bed, a coating feed container, and, for dispensing the liquid coating solution, a tubing pump. The coater, moreover, has a clear outer shell for viewing the process, a grid plate for introducing the fluidizing air, and an air spray nozzle in a center draft tube for atomizing the borosilicate solution. In practice, the sample to be coated was introduced into the coating feed container and fluidized by a stream of pre-heated air from below the grid plate; then the particles were recycled through the draft tube as the borosilicate solution is pumped in, atomizied, and deposited onto the particles, until the particle had a coherent coating thereon.

After the internal parts of the fluid-bed coater were cleaned and dried, an atomizing line was connected to an air supply. The fluid-bed assembly was configured for bottom with a 0.8 nozzle orifice, 7/16 inch Wurster tube height, nozzle cap setting of 3.75, air temperature setting depending on the air humidity, fluidizing air set at #5 setting between 1 and 2 bar. Thermocouple wires had been inserted into the vessel to record the bed temperature.

850 g of the sample to be coated was charged to the coater and preheated while fluidizing for 10 minutes at 120° F. prior to initiating the coating operation. A sample was normally taken after the preheating stage and analyzed for active oxygen content and quick stability. The coating solution feed pump was then started (typical rate was 3 g/min). During the coating operation, the bed temperature was maintained by adjusting the inlet air rate and temperature. After the required amount of coating had been applied, the coating pumps were reversed to empty the feed lines of the coating solution. after stopping the coating pumps, the particles were fluidized for approximately one minute, then their preheater was deactivated and the air to fluid-bed coater stopped. The coated product was then removed from the unit and weighed.

All samples were coated by this procedure.

Stability Test

The stability of the samples, including the encapsulated product were tested using the Open Box Test, which simulates the storage of an open box of a detergent formulation. Unless otherwise specified sufficient peroxygen was blended in a commercial detergent formulation to provide 0.7% active oxygen by weight and then placed in a box. The box containing 0.45 kilograms of formulation was stored with an open lid at 26.7° C. (80° F.) and 80% relative humidity for six weeks. At two week intervals samples were selected by riffling the contents of the box and the active oxygen retained was determined.

EXAMPLES AND TABLES

Using the coating procedure described herein the triple salt of potassium bicaroate ($2KHSO_5 \cdot KHSO_4 \cdot K_2SO_4$) was coated with sodium borosilicate to yield products having a coherent coating of 2 and 4 weight percent sodium borosilicate, respectively. The stability data for the coated product using a zeolite based detergent formulation. is summarized in Table I. Table II summarizes data for the stability data for coated mixtures of potassium bicaroate and sodium peroxydisulfate.

The data provided in these tables demonstrates that coating the triple salt of potassium bicaroate or mixtures of the bicaroate and sodium peroxydisulfate greatly improves the stability of the product and makes it more useful in applications where storage is required or other sensitive materials are present.

TABLE I

Stability of Coated Potassium Bicaroate[1]
(At 80° F./80% Relativity)

| Sample | Ingredients | Initial % AO | % AO at end of 2 weeks | % AO at end of 6 weeks |
|---|---|---|---|---|
| 1 | uncoated potassium bicaroate | 5.0 | 0 | 0 |
| 2 | 2% coated (1) | 4.5 | 100 | 92 |
| 3 | 4% coated (2) | 4.4 | 94 | 91 |
| 4 | detergent[1] + (1) | 4.6 | 100 | 92 |
| 5 | detergent[1] + (2) | 4.4 | 0 | 0 |

[1]Standard Zeolite A based detergent formulation used in an open at jar 80° F./80% Relative Humidity

TABLE II

Stability of Coated Mixtures of
Potassium Bicaroate and Sodium Peroxydisulfate
(At 80° F./ 80% Relativity)

| Sample | Ingredients | Initial % AO | % AO at end of 2 weeks | % AO at end of 6 weeks |
|---|---|---|---|---|
| 6 | uncoated mixture of Potassium bicaroate and sodium peroxydisulfate | 5. | 0 | 0 |
| 7 | 2% coated (3) | 11.0 | 96 | 0 |
| 8 | 4% coated (4) | 10.8 | — | 8.6 |
| 9 | (3) + detergent[1] | 10.0 | 27 | Not tested |
| 10 | (4) + detergent[1] | 10.0 | 27 | Not tested |

[1]Standard Zeolite A based detergent formulation used in an open at jar 80° F./80% Relative Humidity

We claim:

1. A stabilized peroxygen persalt, comprising:
   a bicaroate particle having a coherent sodium borosilicate coating.

2. The stabilized peroxygen persalt of claim 1, wherein the coating is about 2 to about 10 weight percent of the coated particle.

3. The stabilized peroxygen persalt of claim 2, wherein the coating is from about 4 to about 8 weight percent of the coated particle.

4. A stabilized peroxygen bleach comprising a mixture of particulate bicaroate and particulate dipersulfate; said mixture coated with a coherent sodium borosilicate coating.

5. The stabilized peroxygen bleach of claim 4, wherein the coating is from about 2 to about 10 weight percent of the coated particulate.

6. The stabilized peroxygen bleach of claim 5, wherein the coating is from about 2 to about 8 weight percent of the coated particulate.

7. The stabilized peroxygen bleach of claim 6 wherein bicaroate is the triple salt of potassium bicaroate.

8. A stabilized peroxygen bleach, comprising a mixture of particulate bicaroate having a coherent sodium borosilicate coating and a particulate dipersulfate having a coherent sodium borosilicate coating.

9. The stabilized peroxygen bleach of claim 8, wherein the particulate bicaroate and the particulate dipersulfate have from about 2 to about 10 weight percent of the borosilicate coating.

10. The stabilized bleach of claim 8 wherein the bicaroate is the triple salt of potassium bicaroate.

11. A process for making a peroxygen formulation, comprising:
   suspending substantially dry particles of a bicaroate salt in air;
   contacting the dry particles with a plurality of fine drops of an aqueous solution of a soluble sodium silicate and a soluble sodium metaborate; and
   concomitantly maintaining the dry particles at a temperature sufficient to evaporate water at a sufficient rate to avoid moistening or hydrating the dry particles to coat the particles with from about 2 to about 10% by weight of sodium borosilicate.

12. The process of claim 11, wherein the aqueous solution has from about 15 to about 35 weight percent solids, and the weight ratio of silicate to metaborate, expressed as $SiO_2:B_2O_3$, is within the range of from about 0.5:1 to about 2:1.

13. The process of claim 12, wherein ratio of silicate to metaborate is within the range of from about 0.5:1 to about 1:1.5.

14. The process of claim 12, wherein ratio of silicate to metaborate about 1:1.

15. The process of claim 12 wherein the bicaroate salt is the triple salt of potassium bicaroate.

16. A process for making an encapsulated peroxygen formulation, comprising:
   suspending substantially dry particles of a bicaroate salt and a dipersulfate salt in air;
   contacting the dry particles with a plurality of fine drops of an aqueous solution of a soluble sodium silicate and a soluble sodium metaborate; and
   concomitantly maintaining the dry particles at a temperature sufficient to evaporate water at a sufficient rate to avoid moistening or hydrating the dry particles so as to coat the particles with from about 2 to about 10% by weight of sodium borosilicate.

17. The process of claim 16, wherein the aqueous solution has from about 15 to about 35 weight percent solids, and the weight ratio of silicate to metaborate, expressed as $SiO_2:B_2O_3$, is within the range of from about 0.5:1 to about 2:1.

18. The process of claim 17, wherein the particles are coated with from about 4 to about 10 weight percent borosilicate.

19. The process of claim 18 wherein the bicaroate salt is the triple salt of potassium bicaroate.

20. The process of claim 18, wherein the ratio of silicate to metaborate is within the range of from about 0.5:1 to about 1:1.5.

21. The process of claim 20, wherein the particles are coated with from about 4 to about 8 weight percent borosilicate.

22. The process of claim 17, wherein ratio of silicate to metaborate is about 1:1.

23. The process of claim 22, wherein the particles are coated with from about 4 to about 8 weight percent borosilicate.

* * * * *